United States Patent [19]
Davis

[11] Patent Number: 5,198,111
[45] Date of Patent: Mar. 30, 1993

[54] FILTER WITH RECIPROCATING CLEANER UNIT

[75] Inventor: Scott J. Davis, Kalamazoo, Mich.

[73] Assignee: Delaware Capital Formation, Inc., Wilmington, Del.

[21] Appl. No.: 639,518

[22] Filed: Jan. 10, 1991

[51] Int. Cl.$^5$ .............................................. B01D 29/64
[52] U.S. Cl. ................... 210/408; 210/411; 210/414; 210/424; 209/273; 209/387
[58] Field of Search ............... 210/106, 408, 409, 411, 210/413, 414, 415, 424, 396, 407; 209/273, 385, 387

[56] References Cited

U.S. PATENT DOCUMENTS

| | | | |
|---|---|---|---|
| 336,089 | 2/1886 | Chamberland | 210/413 |
| 1,102,791 | 7/1914 | Overly | 210/413 |
| 1,199,350 | 9/1916 | Collin | 210/414 |
| 1,689,277 | 10/1928 | Burns | 210/408 |
| 2,125,532 | 8/1938 | Wells | 210/414 |
| 3,365,065 | 1/1968 | Varjabedian | 210/413 |
| 3,437,204 | 4/1969 | Clarke-Pounder | 209/273 |
| 4,003,837 | 1/1977 | Osborne | 210/413 |
| 4,085,050 | 4/1978 | Gervasi | 210/414 |
| 4,155,841 | 5/1979 | Chupka et al. | 210/415 |
| 4,519,906 | 5/1985 | Hikosaka et al. | 210/223 |
| 4,663,030 | 5/1987 | Chupka et al. | 210/415 |
| 5,087,365 | 2/1992 | Davis et al. | 210/415 |

Primary Examiner—Peter Hruskoci
Assistant Examiner—Robert James Popovics
Attorney, Agent, or Firm—Flynn, Thiel, Boutell & Tanis

[57] ABSTRACT

A self-cleaning filter comprises a filter element in a housing. A cleaning unit, movable with respect to the filter element, removes filtered-out solids from the upstream face of the filter element. The cleaning unit includes an axially movable cleaning element engageable with the filter element.

20 Claims, 7 Drawing Sheets

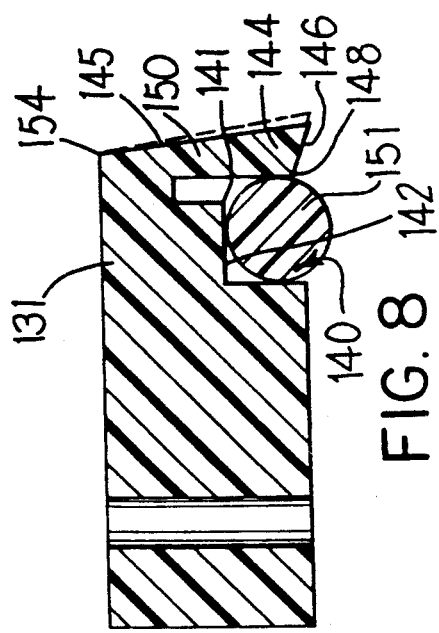
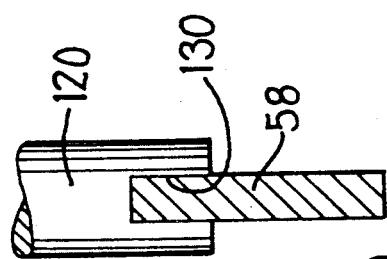
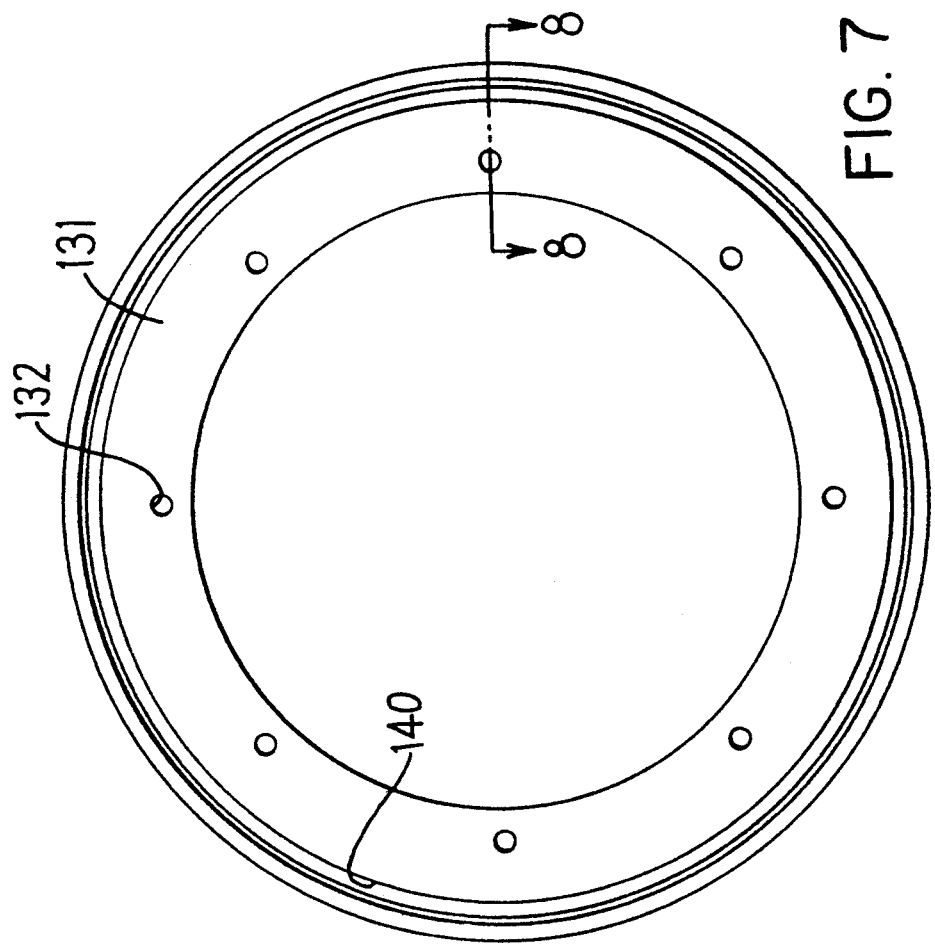

FILTER WITH RECIPROCATING CLEANER UNIT

FIELD OF THE INVENTION

This invention relates to a filter system, and more particularly to a self-cleaning filter system.

BACKGROUND OF THE INVENTION

Self-cleaning pressure filter systems are known.

In systems of this kind available from the assignee of this invention, liquid to be filtered enters the interior of a circular cross section, cylindrical filter element, is filtered by passing radially outward through the perforate wall of the filter element and exits as a filtered liquid from the housing containing the filter element. A rotary cleaning unit orbits a longitudinally extending doctor and wiper circumferentially along the inner face of the filter element for the purpose of reducing the build-up of filtered-out solids on the inner face of the filter element. The purpose is to reduce the amount of backwashing required to maintain filtering efficiency, and thereby to reduce the percentage of down time of the filter system.

Although this prior system works well, the present Applicant has found that continuous cleaning can be achieved without need for cleaning elements extending axially the length of the filter element.

Accordingly, the objects and purposes of the present invention include provision of a self-cleaning filter system in which a cleaning element axially reciprocable along the unfiltered liquid side of the filter element cleans filtered-out solids therefrom, in which the same size axially reciprocable cleaning element can be used in filter elements of any length, in which several cleaning elements may be located to simultaneously clean the filter element, in which the build-up of filtered-out solids is minimized on the entire circumference of the filter element, in which the filter element may be cleaned by doctoring and/or wiping actions, in which the filter element and cleaning element are readily removed from the filter housing for repair or replacement, and in which the cleaning apparatus can be constructed at relatively low cost from commonly available materials without special tools.

Further objects and purposes of the invention will be apparent to persons acquainted with apparatus of this general type upon reading the following description and inspecting the accompanying drawings.

SUMMARY OF THE INVENTION

A self-cleaning filter comprises a filter element in a housing. A cleaning unit movable with respect to the filter element removes filtered-out solids from the upstream face of the filter element. The cleaning unit includes an axially movable cleaning element engagable with the filter element.

BRIEF DESCRIPTION OF THE DRAWINGS

FIG. 7 is an enlarged sectional view substantially taken on the line 7—7 of FIG. 4.

FIG. 8 is an enlarged fragment of FIG. 5 detailing wiper/doctor structure.

FIG. 9 is a fragmentary sectional view substantially taken on the line 9—9 of FIG. 5.

DETAILED DESCRIPTION

Figure 1:
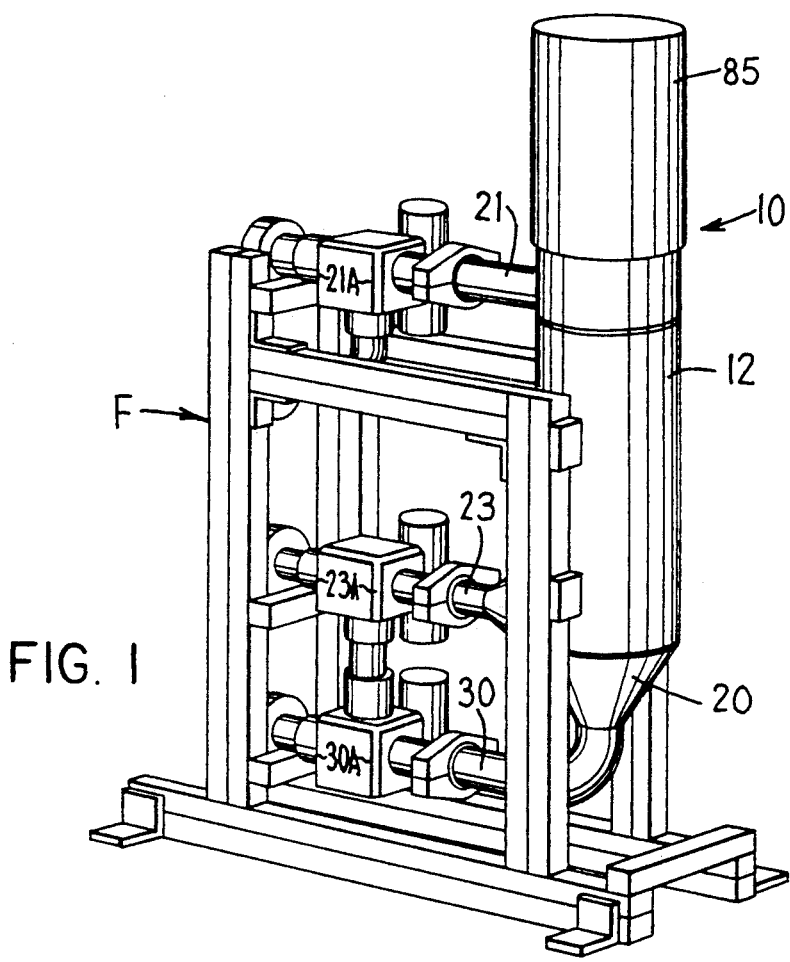
FIG. 1 is a pictorial view of a filter unit, and associated piping, embodying the invention.

A filter unit 10 (FIG. 2) embodying the invention comprises a housing 11. The housing 11 comprises an upstanding, constant circular cross section, tubular casing 12 topped by a removable cover 16. The bottom of the casing 12 is closed by a frustoconical bottom cap 20 welded to the bottom of the casing 12.

A process liquid (liquid to be filtered) inlet conduit 21 (FIG. 2) connects (here radially although a tangential connection is also contemplated) with the upper portion of the casing 12 and opens through the side wall of the upper casing portion into a process liquid chamber 22 defined by the cover 16 and the upper casing portion.

A filtered liquid outlet conduit 23 (FIG. 2) is radially fixedly supported on the side of the bottom portion of the casing 12. The interior of the casing 12 communicates with the outlet conduit 23.

Figure 2:
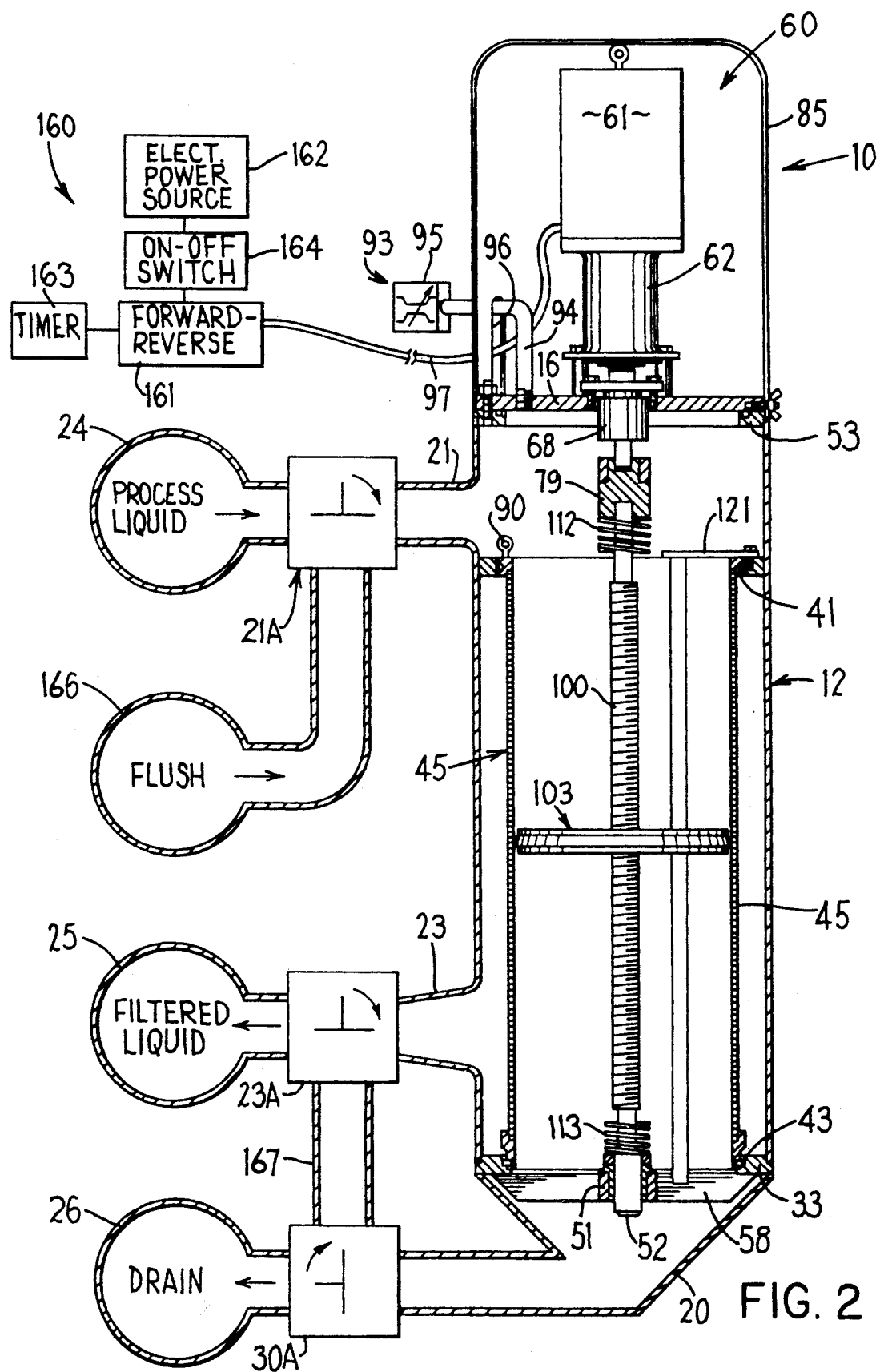
FIG. 2 is an enlarged central cross-sectional view, taken in elevation, of the FIG. 1 apparatus.

An outlet conduit 30 for solids, separated from the process liquid to form the filtered liquid, fixedly extends radially and horizontally from the bottom of the bottom cap 20, as indicated in FIGS. 1 and 2.

The conduits 21, 23 and 30 may be connected in any desired manner to conventional process liquid, filtered liquid and drain pipes 24, 25 and 26 respectively. For example, process liquid to be filtered is conventionally fed from pipe 24 (FIG. 2) through a normally open valve 21A in the process liquid inlet conduit 21. Filtered liquid is conventionally fed through a normally open valve 23A in the conduit 23 to the filtered liquid pipe 25. The solids outlet conduit 30 is normally closed by a valve 30A during normal filtering operation of the filter unit 10 but is openable to drain collected solids from the filter unit therethrough to the drain pipe 26. The valves 21A, 23A and 30A may be of any conventional type actuable as herein described, e.g. 3-way valves.

An external frame F (FIG. 1) supports the above discussed structure.

Upper and lower rigid rings 32 and 33 (FIG. 2) are rigidly fixed, as by welding, to the inner surface of the casing 12 between the conduits 21 and 30, and flanking loosely the conduit 23.

A hollow, circularly cylindrical filter element 40 (FIGS. 2 and 4) comprises an annular top collar 41. The top collar 41 is snugly but slidably received within the upper ring 32 and is liquid sealed with respect thereto by means of a conventional annular seal 43, for example, an O ring. The bottom of the filter element 40 is defined by a bottom collar 44 (FIG. 5) which is slidably but snugly received within the ring 33 and is liquid sealed with respect thereto by a suitable annular seal, such as a further O-ring 43.

The filter element 40 includes a porous filter sleeve 45 (FIG. 5) which may be of any desired rigid conventional construction. In the embodiment shown, the filter sleeve 45 comprises circumferentially close spaced vertical ribs 46 fixed at their ends, as by welding, to the top and bottom collars 41 and 44 and surrounded by annular ribs 47 which are vertically close spaced and are fixed, as by welding, to the outer faces of the vertical ribs 46 to form therewith a filter mesh. However, it is contemplated that other types of rigid porous filter sleeves may be employed. For example, the filter sleeve 45 may comprise circumferentially close-spaced outer vertical ribs surrounding annular inner ribs. As a further example, the filter sleeve may comprise a perforated rigid sheet.

To the extent above-described, the apparatus is substantially conventional. Attention is now directed to portions of the apparatus more specifically embodying the invention.

A cleaning unit 50 (FIG. 2) is coaxially disposed within the filter element 40 for rotation therewithin. The rotating cleaning unit 50 includes a central shaft 52.

A central hub 51 (FIG. 5) is coaxially fixed to the lower ring 33, and thence to the housing 11, by radiating spokes 58 fixed therebetween as by welding. The shaft 52 extends downward coaxially through the process liquid chamber 22 and filter element 40 and is snugly but rotatably received in a top flanged bearing sleeve 55 fixed in the hub 51. A collar 48 is fixed, here by a diametral pin 49, on the shaft 52 and rides rotatably atop the top flange of the bearing sleeve 48. Thus, the bearing sleeve 55 positively limits downward displacement of the rotor 51 and assists means hereafter discussed in maintaining coaxial location of the rotor 51 within the filter element 40 during rotation of the rotor 51.

The filter element 40 is vertically supported in the housing 11 by any convenient means, here by resting its bottom collar 44 on a step in the lower ring 33.

A radially inwardly extending flange 53 (FIG. 3) is fixed, as by welding, at the top of the casing 12. Circumferentially spaced studs 54 are welded to and extend upward from the flange 53 to protrude upwardly through holes 55 in the cover 16. A thin stainless steel liner 56 is fixed to the underside of the cover 16 and seats upon a seal ring 57 recessed in the top of the flange 53. The liner 56 is optional but permits the cover 16 to be made of relatively low cost, low carbon steel without fear of corrosion by liquid to be filtered in the underlying chamber 22. Thus, the cover 16 is removable and is installed on the top of the casing 12 to seal the latter.

The shaft 52 is reversibly driven by any convenient means. For example, in the embodiment shown, a rotary drive assembly 60 (FIG. 2) is supported atop the cover 16. The rotary drive assembly 60 comprises a conventional electric rotate motor 61 fixed to and rotationally driving a speed reducer unit 62 in turn fixedly spaced above the cover 16 by circumferentially spaced vertical screws 63 (FIG. 3) in tubular spacers 64.

A set screw 65 and key 66 rotatably drivingly connect a depending rotatably driven drive shaft 67 of the reducer unit 62 fixedly to the top end of a depending stub shaft 68.

A seal unit 70 comprises an upward opening seal cup 71 depending down through a central opening in the cover 16 and liner 56 and fixed thereto as by welding. The stub shaft 68 extends loosely and coaxially down through the cup 71 and through a central opening 72 at the bottom thereof. Vertically resiliently compressible annular packings 73 are vertically stacked in the cup 71 around the stub shaft 68. A compression ring 74 surrounds the stub shaft 68 and seats atop the annular packing 73. A horizontal compression plate 75 is fixed by circumferentially spaced screws 76 to the underlying cover 16. The compression plate 75 seats atop the compression ring 74 and has a central opening through which the stub shaft 68 snugly but rotatably depends. Tightening of the screws 76 acts through the compression plate 75 and compression ring 74 to downwardly compress the annular packings 73 against the bottom of the cup 71 to sealingly engage the stub shaft 68 while permitting it to rotate. The stainless steel underliner 56 conveniently blinds the bottom end of the threaded holes in the cover 16 receiving the threaded lower ends of the screws 63 and 76.

Figure 3:
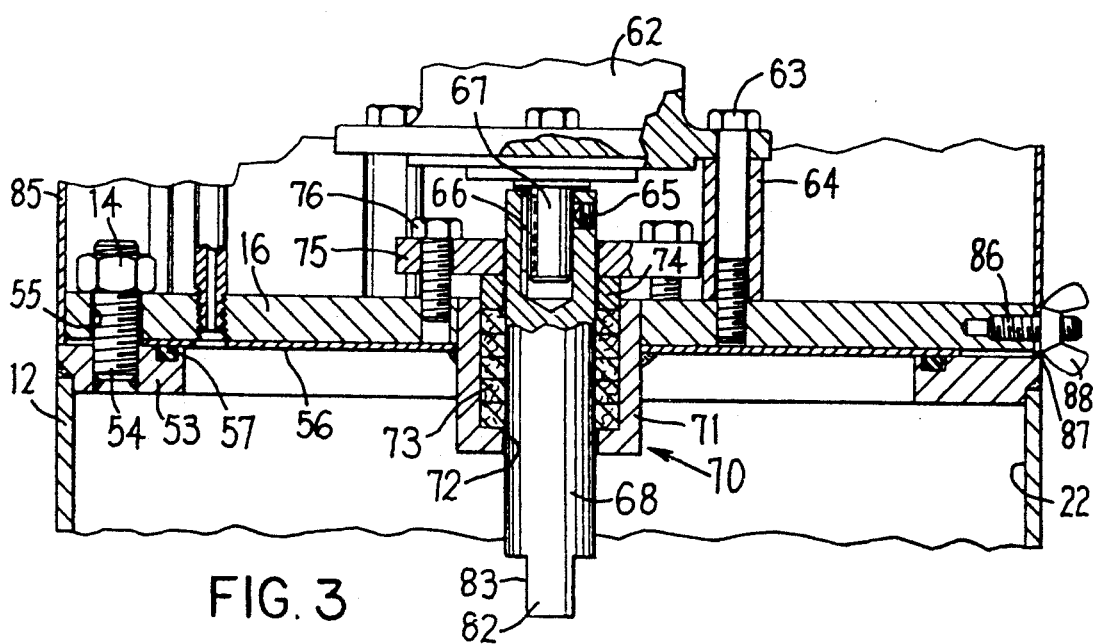
FIG. 3 is an enlarged fragment of FIG. 2, with portions broken away, to show the cover and a portion of the drive for the cleaning unit of the FIG. 1 apparatus.

The cup 71 of the seal unit 70 and depending stub shaft 68 protrude downward centrally into the process liquid chamber 22 (FIGS. 2 and 3). The top of the shaft 52 protrudes upward into the process liquid chamber 22 in coaxial adjacency with the stub shaft 68. The top of the shaft 52 is rotatably drivingly connected to the bottom of the stub shaft 68 by an axially slidably releasable coupling 80. In the embodiment shown, the coupling 80 comprises a diametral slot 81 in the top of a radially enlarged head 79 fixed atop the shaft 52 which receives a depending diametral tongue 82 formed at the bottom of the stub shaft 68. The tongue 82 may be formed by machining diametrally oppositely facing flats 83 on opposite sides of the bottom portion of the stub shaft 68. An annular collar 84 fixed, as by welding, coaxially around the top of the head 79 positively prevents the tongue 82 from sliding diametrically along the slot 81, and thereby maintains coaxial alignment of the stub shaft 68 and shaft 52, as the stub shaft 68 rotatably drives the shaft 52.

Accordingly, a coaxial rotatable drive is established from the upper drive shaft 67 of the motor driven speed reducer unit 62 downward through the stub shaft 68 and axially slidable coupling 80 to the shaft 52. The electric rotate motor 61 and speed reducer unit 62 are conventional and require no further description.

In the preferred embodiment shown, a light weight, inverted, cup-shaped shroud 85 (FIG. 2) covers the motor 61 and speed reducer 62 and overlaps the peripheral edge of the cover 16, to rest on the upper and radially outer corner portion of the flange 53. The shroud 85 (FIG. 3) is conveniently releasably held in place by circumferentially distributed studs 86, each threaded radially into the edge of the cover 16 and loosely received through a downward opening notch 87 in the lower edge of the shroud 85. A wing nut 88 is threaded on the outer end of the stud 86 and tightened to frictionally hold the lower edge portion of the shroud 85 against the radially outer edge of the cover 16.

In the embodiment shown in FIG. 2, process liquid from the pipe 24 will sometimes carry entrained gases into the top of the filter housing 11 where such gases may become trapped and build up over time to lower the liquid level in the housing 11 and even in the filter element 40. To prevent this problem, an air bleed unit 93 (FIG. 2) comprises a relatively small bore conduit 94 connected at its lower end to the highest point in the housing 11, namely through the cover 16, and extending to a variable restrictive orifice 95 disposed outside the shroud 85. The variable restrictive orifice 95 is manually adjustable in a conventional manner continuously from fully closed to open to either continuously or intermittently vent the top of the housing 11 to the desired extent required to avoid a substantial buildup of air or other gases in the top of the housing 11 and thus to ensure that the liquid level remains above the top of the filter element 40. In the embodiment shown, the conduit 94 is bent and is routed out from within the shroud 85 to the external variable restrictive orifice 95 through a downward opening notch 96 in the lower portion of the shroud 85. The notch 96 may also be used to route an electric power line 97 into the shroud 85 and thence to the motor 61 for energizing same.

Two or more (here three) lift lugs 90 (FIGS. 2 and 3) are evenly circumferentially spaced on and upstanding from and fixed (as by welding) to the filter element top collar 41. Thus, the lift lugs 90 act as handles, upon removal of the cover 16, to pull up the filter element 40 out of the casing 12 for repair, replacement or the like.

Figure 4:
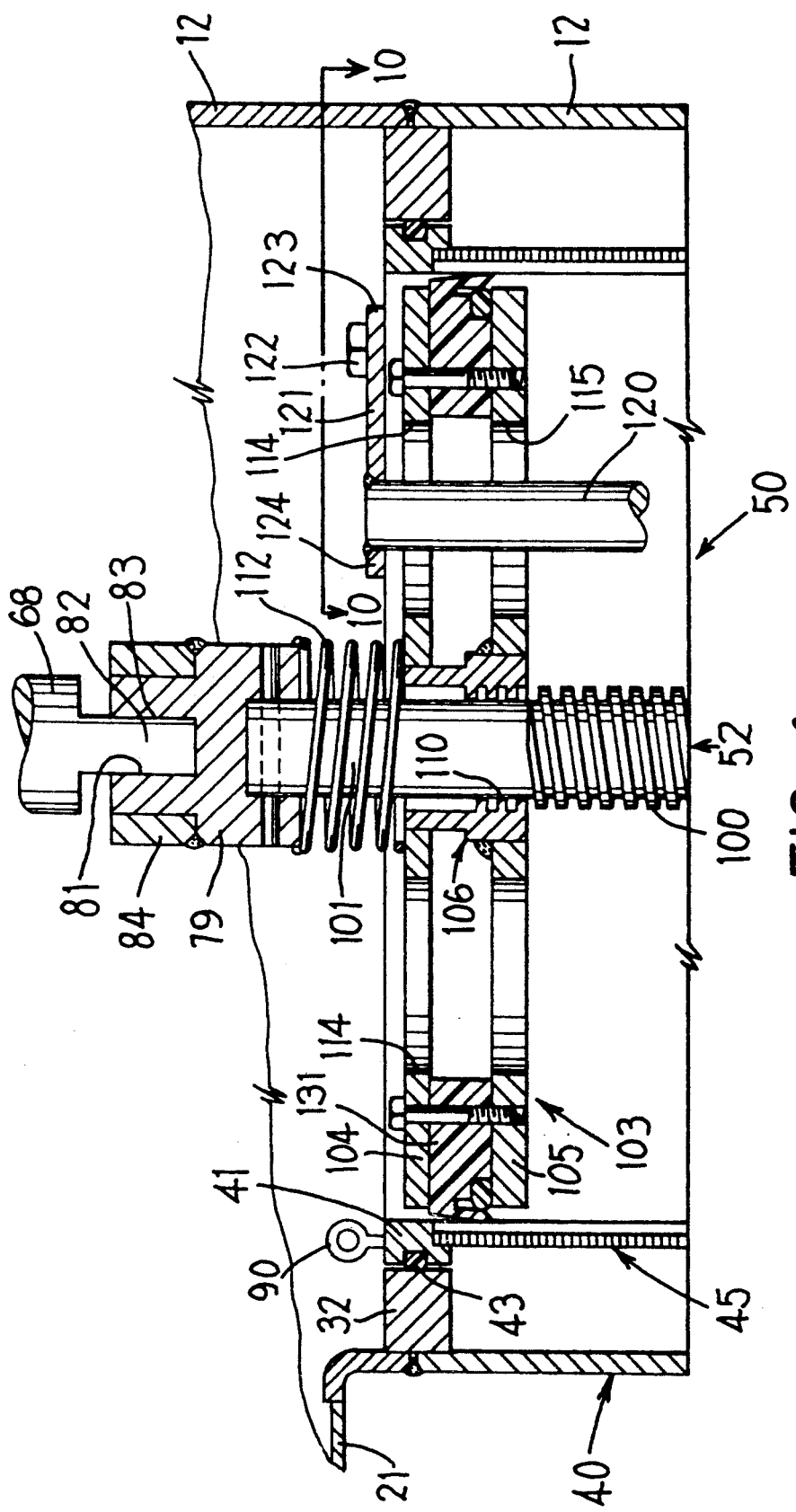
FIG. 4 is an enlarged fragment of the top portion of the filter element of FIG. 2.
Figure 5:
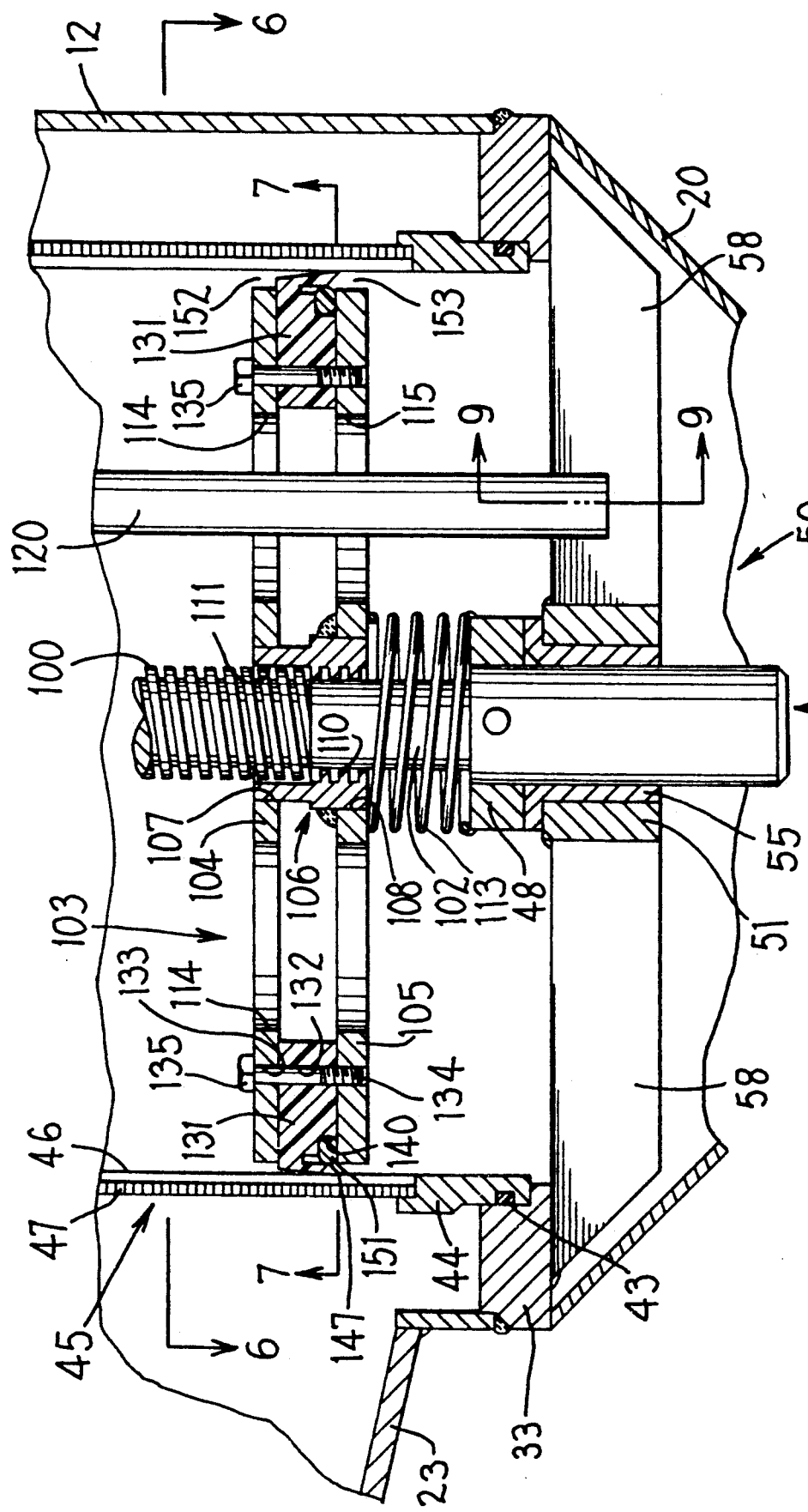
FIG. 5 is an enlarged fragment of the bottom portion of the filter element of FIG. 4.
Figure 6:
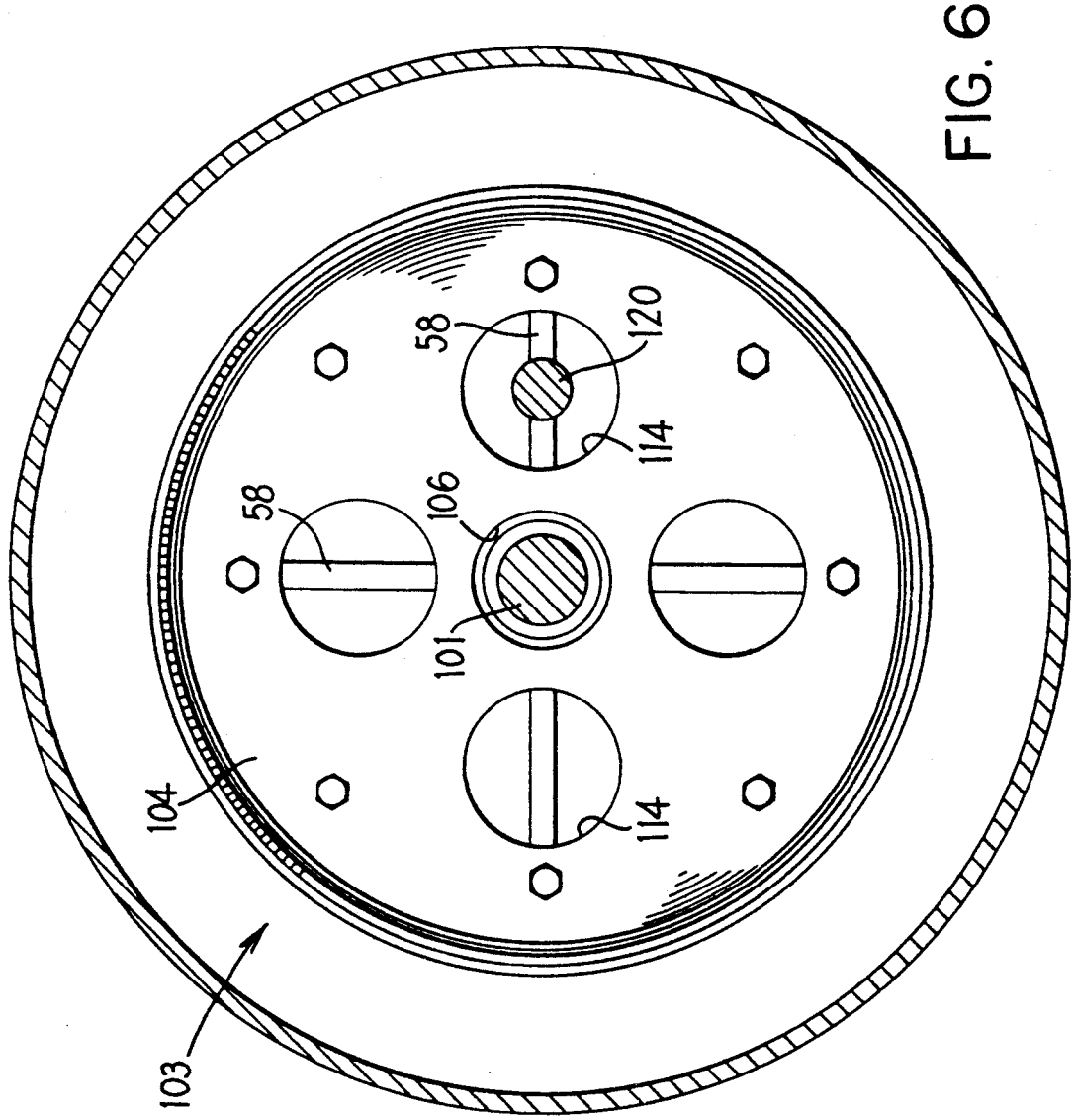
FIG. 6 is an enlarged sectional view substantially taken on the line 6—6 of FIG. 4.

Turning now in more detail to the rotating cleaning unit 50 (FIGS. 2–6) embodying the invention, the major central portion of the shaft 52 is externally threaded at 100, for example with an Acme thread, in the manner of a feed screw, particularly as seen in FIGS. 4 and 5. The upper and lower ends of the thread 100 are spaced axially from the shaft head 79 and the collar 48, respectively, by relatively short cylindrical top and bottom portions 101 and 102. The top and bottom portions 101 and 102 are of diameter equal to or less than the diameter of the root of the thread 100.

The rotating cleaning unit 50 further comprises a disk-like cleaning member 103 (FIGS. 4 and 5). The cleaning member 103 comprises axially spaced top and bottom plates 104 and 105 which are circular in shape and of outside diameter slightly less than the inside diameter of the filter sleeve 45. The hub 106 at its top and bottom ends is snugly received through central openings 107 and 108 in the top and bottom plates 104 and 105 respectively and is fixed to such plates as hereafter discussed. The bottom plate 105 is here welded to the hub 106. A portion, in approximately the lower half, of the central bore of the hub 106 is internally threaded at 110 to threadedly engage the threads 100 on the shaft 52 in the manner of a nut on a bolt. The remainder 111 of the bore of the hub 106, here the upper half thereof, is cylindrical and of diameter to snugly but axially slidably, engage the crest of the threads 100.

Thus, engagement of the threads 100 and 110 and rotation of the shaft 52 causes the disk-like cleaning member 103 to move axially along the shaft 52 between top and bottom positions respectively shown in FIGS. 4 and 5, while sliding engagement between the cylindrical portion 111 of the internal bore of the hub 106 and the crest of the threads 100 helps maintain the disk-like cleaning member 103 perpendicular to the shaft 52.

Compressible resilient means, here coil compression springs 112 and 113 (FIGS. 4 and 5 respectively), encircle the shaft 52 above and below the cleaning member 103. The top spring 112 (FIG. 4) is interposed between the shaft head 79 and the top of the cleaning member 103, respectively. The top spring 112 is partly compressed axially therebetween with the cleaning member 103, brought to its uppermost (FIG. 4) position by appropriate rotation of the shaft 52 and interengagement of the threads 100 and 110. In this position, the partially compressed spring 112 urges the bottom of the internal thread 110 of the hub 106 downward against the top of the external thread 100 of the shaft 52, as the shaft 52 continues to rotate after having raised the cleaning member 103 to its FIG. 4 uppermost position shown.

Upon reversal of rotation of the shaft 52, the spring 112 assures that the shaft thread 100 will threadedly engage the hub thread 110 and cause the cleaning member 103 to move down toward its FIG. 5 position during continued reverse rotation of the shaft 52.

Similarly, the spring 113 (FIG. 5) is axially interposed between the collar 48 and the cleaning member 103. With the cleaning member 103 in its FIG. 5 bottommost position, the spring 103 is partly compressed between the collar 48 and the bottom plate 105 of the cleaning member 103, so as to axially urge the internal threads 110 of the hub 106 upward against the bottom of the shaft thread 100. Thus, the cleaning member 103 will ride in its FIG. 5 bottom position until rotation of the shaft 52 is restored to its original direction, at which time the bottom spring 113 will urge the cleaning member 103 to inter-engage the threads 111 and 110 so that continued rotation of the screw 52 threads the cleaning member 103 upward therealong.

The springs 112 and 113 are maintained coaxial with the shaft 52 by any convenient means. For example, the springs 112 and 113 may be welded to the top and bottom plates 104 and 105, respectively, of the cleaning member 103. Alternatively, the springs 112 and 113 may instead be welded to the shaft head 79 and collar 48, respectively.

It will be noted that the FIG. 4 top and FIG. 5 bottom rest positions of the cleaning member 103 occur when the thread 110 on the cleaning member 103 no longer interfingers with the thread 100 on the shaft 52 but rather is entirely sleeved over the cylindrical top or bottom portion 101 or 102 of the shaft 52 as seen in FIGS. 4 and 5.

Thus, when the disk-like cleaning member 103 approaches the top or bottom end of its travel, continued rotation of the shaft 52 advances the threads 110 of the cleaning member 103 off the end of the threads 100 of the shaft against the axially opposing force of the corresponding spring 112 or 113 and the cleaning member 103 holds this axial position during continuation of shaft rotation in the existing direction, the opposing axial ends of the threads 100 and 110 riding on one another axially to hold the cleaning member 103 against the adjacent spring 112 or 113.

However, when the shaft 52 reverses rotation, the threads 110 of the cleaning member 103 can now threadedly engage the threads 100 on the shaft 52 to advance the cleaning member 103 toward the opposite end of the shaft and out of compressing relation with the adjacent spring 112 or 113. Thus, while it is desirable to reverse the rotational direction of the shaft 52 soon after the cleaning member 103 reaches the upper and lower limits of its threaded travel along the shaft 111, timing of the reversal of shaft rotation need not be precise since the cleaning member 103 can be left at either extreme of its axial travel along the shaft 52 for a time, without injury to the apparatus.

Further, as discussed above, even after the cleaning member 103 has threaded off the end of the shaft thread 100, within one rotation of the shaft 52 in the reverse direction the adjacent spring 112 or 113 restores threaded interengagement of the cleaning member threads 110 and the shaft threads 100 and enables the shaft threads 100 to carry the cleaning member 103 away toward the opposite end of the shaft 52.

Since shaft reversal need not be precisely synchronized with the cleaning member 103 reaching its axial end of travel, the inventive apparatus eliminates jamming of the threads 100 and 110 at the end of cleaning member travel while also eliminating the need for limit switches or other additional means to sense the position of the cleaning member 10 and from it control the rotational drive for the shaft 52. Thus, there is no need, for example, for axial position sensing limit switches engageable with the cleaning member 103, shaft revolution counters, timers synchronized with the rotational speed of the shaft 52, and the like. There is also no need to use a stepper motor at 61. While it is contemplated, within a broad aspect of the invention, that such other means as these could be used to reverse shaft 52 rotation at the ends of cleaning member 103 travel, the above detailed FIG. 4,5 structure, including elements 101, 102, 112, 113, and 106, is preferred, for example in view of its simplicity, durability and low cost.

To allow relatively free flow of liquid to be filtered from the process liquid inlet 21 down through the entire length of the filter sleeve 45, a plurality, here four, of evenly circumferentially spaced large holes 114 (FIGS. 4–6) are provided axially through the top plate 104 of the cleaning member 103. For the same reason, similar holes 115 are provided axially through the bottom plate 105. To maximize flow therethrough, the holes 114 are preferably axially aligned with corresponding ones of the holes 115.

So that the rotation of the shaft 52 can raise and lower the cleaning member 103, the cleaning member 103 cannot be free to rotate with the shaft 52. To this end, an antirotate rod 120 (FIGS. 4, 5 and 6) is fixed with respect to the filter casing 12 and extends vertically down through an eccentric portion of the cleaning member 103. In the embodiment shown, the antirotate rod 120 conveniently extends loosely downward through one of the holes 114 and the axially aligned hole 115 in the cleaning member top and bottom plates 104 and 105. Thus, rotation of the cleaning member 103 is limited to a circumferential distance somewhat less than the diameter of the hole 114 or 115.

Figure 10:
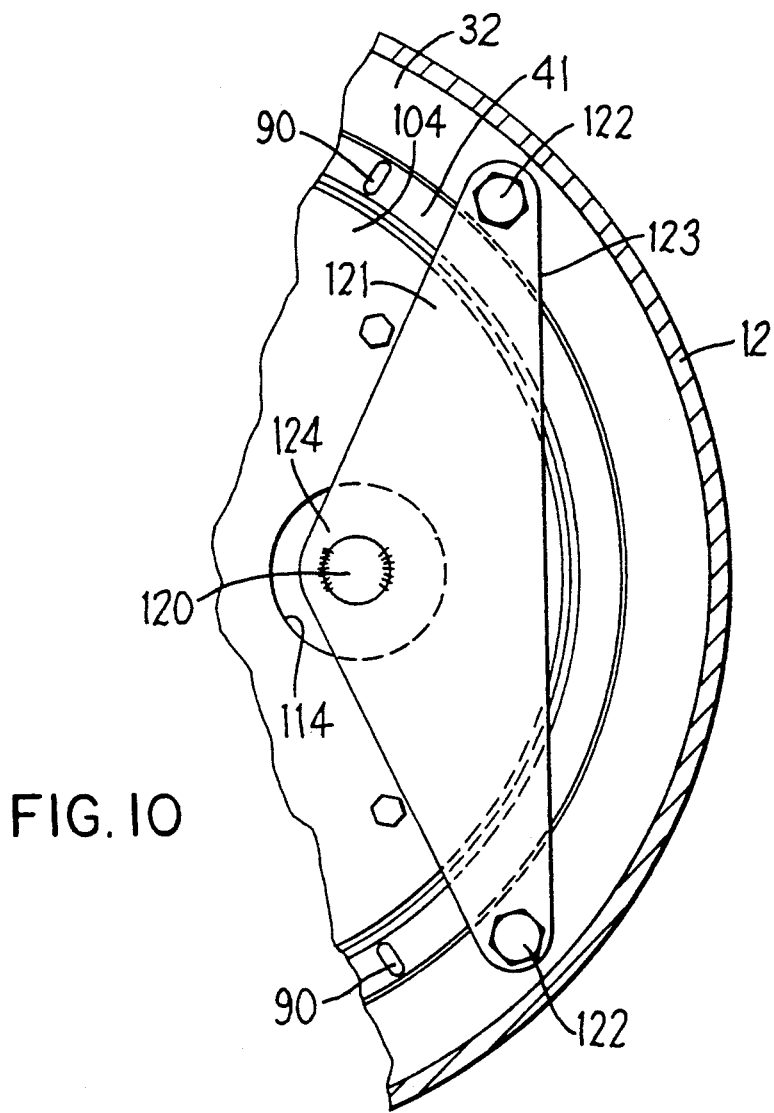
FIG. 10 is a sectional view substantially taken on the line 10—10 of FIG. 4.

The top of the rod 120 is fixed, as by welding, to a generally plate-like, horizontal bracket 121 (FIGS. 4 and 10). The bracket 121 has a base edge 123 that extends chord-like across about one quarter of the circumference of the ring 32 to ends that are fixed atop the ring 32 by circumferentially spaced cap screws 122. The central part of the bracket 121 extends radially inward from the ring 32 to an apex 124. The top of the rod 120 is welded to the apex 124 to rigidly maintain the vertical alignment and horizontal position of the rod 120.

The bottom portion of the rod 120 has a diametral and downward opening notch 130 which is sized and shaped to snugly but vertically slidably straddle the underlying spoke 58. Thus, the underlying spoke 58 positively prevents movement of the bottom of the rod 120 in a direction circumferentially around the shaft 52. Since the rod 120 is substantially centered in the holes 114 and 115 of the cleaning member 103, circumferential urging of the cleaning member 103 clockwise or counterclockwise against the rod 120 does not tend to displace its lower end radially along the straddled spoke 58. By removing the cap screws 122 and lifting the bracket 121, the anti-rotate rod 120 is fully removable from the filter unit 10.

The bracket 121 clamps down and thereby fixes the filter element 40, against unintended rotation and upward movement with respect to the housing 11.

The cleaning member 103 further includes at least one wiper/scraper ring 131 (FIGS. 4, 5, 7 and 8). The ring 131 (FIGS. 5 and 7) has horizontal top and bottom surfaces and is sandwiched coaxially between the top and bottom plates 104 and 105. Circumferentially spaced holes 132 (FIG. 7) extend vertically through the ring 131 and align with corresponding holes 133 and 134 in the top and bottom plates 104 and 105 between which the ring 131 is coaxially located. The ring 131 is axially pressed between the top and bottom plates 104 and 105, and the top plate 104 and ring 131 are fixed with respect to the hub 106, by evenly circumferentially distributed screws 135 which each extend down through aligned holes 133 and 132 in the top plate 104 and ring 131 and threadedly engage in an aligned hole 134 in the bottom plate 105 welded to the hub 106.

Whereas the above-described other parts are metal, preferably a corrosion-proof metal such as stainless steel, the ring 131 preferably is of a relatively slippery, non-corrodible, wear-resistent plastics material, preferably molded polyethylene.

As seen in FIGS. 5, 7 and 8, a stepped annular groove 140 is provided in the top or bottom (here bottom) face of the ring 131. The bottom of the groove is stepped at 141 to provide an almost square cross section radially inboard groove portion 142 of lesser axial depth and a radially outboard groove portion 143 of greater depth. The groove 140, and particularly the radially outboard portion 143 thereof, is radially bounded by a circumferential flange 144. The flange 144 has a sloped outer face 145 which radially thickens the flange 144 toward the free (here, lower) end 146 thereof. In the embodiment shown, the outer face 145 slopes at about a 6° to 9° (preferably 7.5°) angle to the vertical. Thus, the flange 144 is thickest at its free (here lower) end, or rim, 146 and thinnest where it circumferentially bounds the bottom of the radially outer portion 143 of the groove 140. The free (here, bottom) rim 146 of the flange 144 slopes (preferably from 10° to 20° and here at about 15°) to the radial plane of the cleaning member 103, to extend from its outer edge 147 radially inward and axially inward (here upward) of the ring 131 to the radially outer edge of the groove 140. The outer edge 147 preferably is flush with the bottom face of the ring 131, whereas the radially inner edge 148 of the rim 146 is spaced somewhat axially inboard of (here above) that face.

The outer edge 147 forms the wiping/scraping edge of the cleaning member 103. The radially narrow portion 150 of the flange 144 is more elastically bendable than the radially thicker portion of the flange 144 adjacent the rim 146. This allows the flange 144 to bend radially in and out somewhat (as generally indicated by the adjacent dotted lines in FIG. 8). The portion of the flange 144 adjacent the rim 146 is stiffer, to better back the wiping/scraping edge 147. The at-rest diameter of the wiping/scraping edge 147 slightly exceeds the inside diameter of the filter sleeve 45 (FIG. 5) so that the inherent resilience of the flange 144 tends to keep its wiping/scraping edge 147 firmly against the interior face of the filter sleeve 45 as the cleaning member 103 goes up and down therewithin.

To ensure adequate radially outward pressure of the wiping/scraping edge 147 against the filter sleeve 45, a resilient O-ring 151 is pressed into the groove 140. The O-ring 151 is of diameter equal to or slightly greater than the radial width of the groove 140. In one unit constructed in accord with the invention, the radial width of the groove 140 was 0.250 inch and the axial depth of the groove was 0.200 inch, making the groove 140 slightly less in depth than in radial width. The diameter of the O-ring 151 thus exceeds the axial depth of the groove 140. Thus, in the unassembled condition of the ring 131, a portion of the O-ring 151 protrudes axially from the groove 140. However, with the ring 131 clamped by the screws 135 between the top and bottom plates 104 and 105, the O-ring 151 is axially compressed and thereby attempts to expand radially and thereby to bend radially outward, in a resilient manner, the flange 144. Thus, with the cleaning member 103 installed within the filter sleeve 45 as shown in FIG. 5, the resilient O-ring 151 contributes substantially to the radially outward push of the wiper/scraper edge 147 against the interior surface of the filter sleeve 45. This keeps the wiper/scraper edge 147 pressed firmly radially outward against the interior face of the filter sleeve 45 despite usual filter sleeve diameter tolerances, surface texture, surface imperfections, and other slight variations in the interior diameter of the filter sleeve 45.

The diameter of the circular top and bottom plates 104 and 105 leaves corresponding annular gaps 152 and 153, respectively, between the edge of such plates and the filter sleeve 45, as seen in FIG. 5.

The outside diameter of the ring 131 at its base edge 154 (upper edge in FIGS. 4, 5 and 8), namely the edge axially remote from the wiper/scraper edge 147, is approximately the same as the diameter of the top and bottom plates 104 and 105, or may exceed same by a few thousandths of an inch. Thus, the adjacent one of the plates (here, plate 104) rigidly backs the ring 131 at or adjacent the base edge 154.

A convenient control means 160 (FIG. 2) may be used to rotate and change the rotational direction of the shaft 52. For example, FIG. 2 discloses a conventional forward/reverse control 164 interposed between a conventional electric power source 162 and the electric power line 197 leading to the reversible motor 61. A timer 163 periodically shifts the forward/reverse control 164 back and forth between its two states to thereby periodically rotate the shaft 52 in the clockwise and counterclockwise directions. The timer 163 is preferably set such that adequate time is allowed for the cleaning member 103 to axially travel the entire length of the threaded portion 100 of the shaft 52. An on/off switch 164 is interposed between the power source 162 and forward/reverse control 161 to connect or disconnect the electric power source 162 from the forward/reverse control 161. The forward/reverse control 161, timer 163 and on/off switch 164 may be conventional. Indeed, if desired, the functions of the elements 161, 163 and 164 can be carried out manually.

To permit occasional flushing of the filter element 40, a flush liquid pipe 166 connects to the valve 21A. Further, a bridging conduit 167 connects the valves 23A and 30A (FIG. 2).

OPERATION

During normal filtering operation, process liquid from pipe 24 is led through valve 21A into the top portion 14 of the casing 12 (FIG. 2) and down into the interior of the filter element 40. The process liquid is under pressure and flows radially outward through the porous filter sleeve 45 and thence out through the valve 23A into the filtered liquid pipe 25, leaving filtered-out solids on the inner face 102 of the filter sleeve 45. The valves 21A, 23A and 30A of FIG. 2 are in their positions schematically shown and there is no flow from the backwash pipe 166 to the filter housing 11 or away from the filter housing 11 to the drain pipe 26.

During such filtration, the rotate motor 61 and speed reducer 62 rotate the stub shaft 68, coupler 80, and shaft 52 and thus the remainder of the rotor 51, for example, in a given counterclockwise direction as seen in FIG. 4.

Upon actuation of the control 160, the reversible motor 61 is actuated to rotate the shaft 52 in a given direction. Assume that causes the shaft thread 100 to move the cleaning member 103 downwardly and finally into its FIG. 5 bottom position wherein the cleaning member threads 110 leave threaded engagement with the shaft threads 100 but are held axially against the lowest shaft thread 100 by the partially compressed spring 113. Thereafter, upon reversal of the motor 61, as by the control 160, the cleaning member threads 110, due to the upward force of the spring 113, thread into the shaft threads 100, which now pull the cleaning member 103 upward.

Eventually the cleaning member 103 reaches its uppermost position wherein its threads 110 leave threaded engagement with the top of the shaft threads 100 but continue to ride on the upper end of the shaft threads 100 due to the downward force of the partially compressed upper spring 112. This upper position of the cleaning member 103 is maintained until the direction of the motor 61 is changed back to its original direction, as by the control 160, whereupon the partially compressed spring 112 urges the cleaning member threads 110 into threaded engagement once again with the shaft threads 100, enabling the shaft threads 100 to thread the cleaning member downwardly. When the cleaning member 103 reaches its lower position at FIG. 5, the cycle above-described repeats.

During up and down movement of the cleaning member, the cleaning member is prevented from completing more than a minor arc of rotation by interference between rod 120 and the holes 114 and 115 in the cleaning member 103. Accordingly, the cleaning member 103 cannot rotate with the rotating shaft 152 and thus must thread up and down therealong.

In the embodiment shown, during downward movement of the cleaning member, the outer edge 147 of the ring 131 rides in a scraper-like manner along the interior face of the filter sleeve 45 and scrapes therefrom solids left thereon by liquid being filtered as the latter passes radially outward through the filter sleeve 45. Solids thus scraped from the filter sleeve 45 tend to drift downward by gravity between the spokes 58 (FIG. 5) and fall into the filter housing lower cap 20 for removal by periodic opening of the solids output drain 30A and thence into the drain conduit 26. The continuous downward wash of liquid to be filtered through the holes 114 and 115 in the cleaning member 103 tends to help this downward movement of dislodged solids.

During upward movement of the cleaning member 103, the outer edge 147 of the ring 131 wipes upward along the filter sleeve 45, being pressed firmly thereagainst by the O-ring 151. Particles wiped from the interior wall of the filter sleeve 45 are brought up with the rising cleaning member 103. When the cleaning member 103 hits its maximum height and thereafter is caused to move downwardly, the incoming flow of process liquid tends to remove masses of solids which have been lifted to the top of the filter sleeve, and such solids then tend to drift downward through the openings 114 and 115 in the cleaning member 103, and thereby again by gravity and by the generally downward flow of process liquid to be filtered, these solids masses tend to fall down through the bottom of the filter sleeve, and downward past the spokes 58, into the cap 20 for subsequent removal by brief opening of the valve 30A.

The cleaning unit 50 will tend to prevent loss of filtering efficiency over a long period of time. However, it may eventually be desired to flush the filter element 40 and the interior of the housing 11 with water or some other suitable solvent, to further clean the structure within the housing 11 and also to flush away solids which have collected over time in the bottom cap 20 of the housing 11.

To do so, the valves 21A, 23A and 30A (FIG. 2) are rotated 90° clockwise from their positions shown. This isolates the process liquid and filtered liquid pipes 24 and 25 from the remainder of the apparatus and allows flush liquid (for example, water) under pressure to pass through the valve 21A into the top portion 14 of the housing 11 and then downward into the interior of the filter element 40, and out the bottom thereof through the now open valve 38 to the drain pipe 26, to flush away any solids remaining on the inner face 102 of the filter sleeve 45 and on the parts of the cleaning unit 50, including the cleaning member 103 thereof, and to further flush away fallen solids which have accumulated in the bottom cap 20. In addition, flushing liquid passing radially outward through the filter sleeve 45 fills the casing 12 outside the filter element 40 and carries away any minor solids accumulations and residual filtered liquid out through the outlet conduit 23, the clockwise shifted valve 23A, a bridging conduit 147 between the valves 23A and 30A, the clockwise shifted valve 30A and thence to the drain pipe 26. It is possible and indeed desirable to energize the motor 61 to move the cleaning member 103 during such flushing to even more thoroughly clean off the filter sleeve 45 and cleaning member 103. After flushing is completed, valves 21A, 23A and 30A may be returned clockwise to their normal filtering position. To assure that all flushing liquid is removed from the housing 11, clockwise return of the valves 23A and 30A may be delayed briefly. Such flushing is also desirable when changing from one process liquid to another.

From time to time, it may be desired to remove the structure within the housing 11, for example, to examine same, subject same to a meticulous hand cleaning, replace worn parts, or for any other reason. This is readily and quickly accomplished by loosening the wing nuts 88 (FIG. 3) and lifting off the shroud 85 to expose the nuts 14. Removal of the nuts 14 permits the cover 16, with its liner 56, seal unit 70 and stub shaft 68, together with the motor 61 and speed reducer 62 thereon, to be lifted off the housing flange 53.

Upon removing the screws 122, the bracket 121 and rod 120 can be lifted out of the housing 11. One can then grip the top of the shaft 52 and pull it upward, thereby sliding the cleaning unit 50 up out of the filter element 40 and thence up out of the casing 12. The ring 131 can be replaced by removing the screws 135 and top plate 104 from the cleaning member 103.

Thereafter, by pulling upward on the lift lugs 90, the filter element 40 can also be lifted out of the casing 12 through the annular flange 53.

Reassembly of the apparatus is by reversal of the foregoing steps.

MODIFICATION

Figure 11:
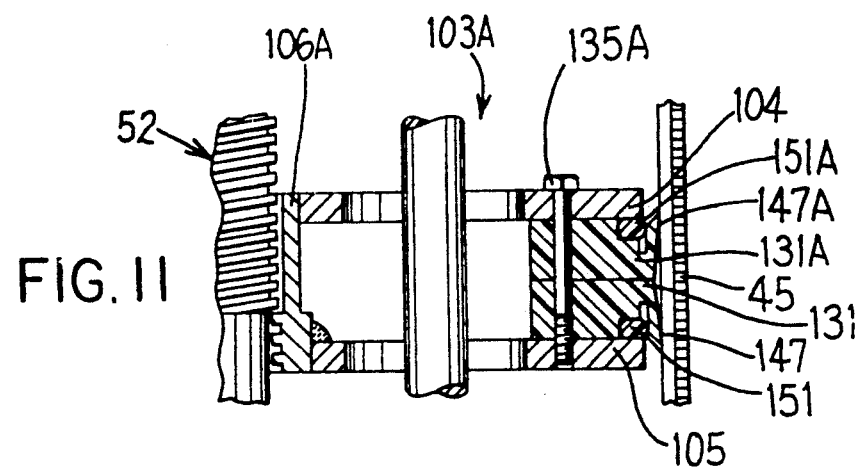
FIG. 11 is a fragment of FIG. 7 but showing a further modification.

Attention is directed to FIG. 11 showing a modified cleaning member 103A which is similar to the abovedescribed cleaning member 103 of FIG. 5, except as follows. The modified cleaning member 103A, in addition to the plate 104, ring 131 and plate 105 (FIG. 5) includes a second wiper/scraper ring 131A placed upside down atop the ring 131. These elements are stacked coaxially and are rigidly fixed together in sandwiched relation by extended length screws 135A extending down through the elements 104, 131A, 131 and threaded into the bottom plate 105. In view of its added height, the modified cleaning member 103A is provided with a correspondingly taller hub 106A. In a manner not shown, the top of the threaded portion 100 of the shaft 52 is spaced further down from the top of the shaft 52, by an amount at least equal to the height of the further ring 131A, so that the taller modified cleaning member 103A, at its upper position not shown, can threadedly disengage the threads 100 of the shaft 52 without contacting the bracket 121 (FIG. 4) or excessively compressing the spring 112. In other words, the top of modified cleaning member 103A can rise no higher than the top of cleaning member 103 of FIG. 4.

The further ring 131A is provided with a further O-ring 151A preferably identical to the O-ring 151 of the ring 131.

Accordingly, in the modified FIG. 11 embodiment, the wiping/scraping edges 147 and 147A of the rings 131 and 131A are aimed axially away from each other, as seen in FIG. 11 so that, regardless of the direction of vertical movement of the modified cleaning member 103A, one of the edges 147, 147A will be in scraping mode and the other will be in wiping mode. Such modes reverse with reversal of direction of travel of the modified cleaning member 103A.

The speed or rotation of the shaft 52 and the vertical speed of the cleaning member 103 may vary, as desired. However, in one unit constructed according to the invention, both speeds were relatively low. For example, in one instance the shaft 52 turned at 30 revolutions per minute to move the cleaning member 103 six inches per minute.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A self-cleaning filter, comprising:
   a housing having an inlet port for process liquid to be filtered and an outlet port for filtered liquid;
   a filter element in said housing, said filter element having an inflow face communicating with said inlet port and an outflow face communicating with said outlet port;
   a cleaning unit comprising an annular cleaning member movable axially along said filter element and having an annular cleaning edge movable therewith in cleaning engagement with said inflow face of said filter element to remove collected solids therefrom;
   drive means drivable for moving said annular cleaning member axially back and forth along said filter element;
   motor means actuable to drive said drive means, said cleaning member being a disk-like annulus and comprising two annular plates fixedly sandwiching a ring member therebetween, said ring member having attached to it said annular cleaning edge, and carrying resilient means radially backing said cleaning edge and resiliently axially compressible between said plates for resiliently radially outwardly expanding said annular cleaning edge against said inflow face of said filter element.

2. The apparatus of claim 1 in which said resilient means comprises an O-ring, said cleaning member having means radially and axially backing said O-ring, said cleaning member including means for pressing said annular plates toward each other for axially compressing said O-ring and thereby radially outwardly expanding said O-ring, said cleaning edge being backed radially by said O-ring and thereby being radially outwardly urged against the filter element by said radially outward expansion of said O-ring.

3. The apparatus of claim 2 in which said cleaning edge is circumferentially continuous and in substantially continuous circumferential cleaning engagement with said filter element.

4. A self-cleaning filter, comprising:
a housing having an inlet port for process liquid to be filtered and an outlet port for filtered liquid;
an annular filter element in said housing and separating said ports, said filter element having an interior inflow face communicating with said outlet port;
a solid cleaning disk of diameter slightly less than the inside diameter of said filter element and movable axially along said filter element inflow face in radially close spaced relation therefrom, and a cleaning ring coaxially fixed on the radially outer portion of said disk in substantially complete circumferential cleaning contact with said filter element inflow face for removing filtered-out solids therefrom, said cleaning disk having process liquid flow holes axially therethrough for passage of process liquid to be filtered and removed filtered-out solids away from said inlet port;
drive means extending through said disk generally along the length of said filter element and drivable for moving said cleaning disk axially back and forth along said filter element, said cleaning disk having an antirotate hole axially therethrough offset circumferentially from adjacent ones of said process liquid holes, an antirotate rod fixed with respect to said housing and extending axially within said filter element loosely through said antirotate hole in said cleaning disk for limiting rotation of said cleaning disk with said screw, said antirotate hole being of substantially larger diameter than said rod so as to act as an additional process liquid flow hole.

5. The apparatus of claim 4 in which said drive means comprises an elongate screw rotatably mounted with respect to said housing, said annular cleaning member including nut means threadedly engaging said screw for moving said annular cleaning member along the inflow face of said filter element upon rotation of said screw, said holes being radially outboard of said screw.

6. A self-cleaning filter, comprising:
a housing having an inlet port for process liquid to be filtered and an outlet port for filtered liquid;
a filter element in said housing, said filter element having an inflow face communicating with said inlet port and an outflow face communicating with said outlet port;
a cleaning member movable along said filter element inflow face and having a body with opposite facing first and second surfaces extending transverse to said filter element inflow face, a groove in said first surface, said cleaning member having a flange fixed to said body at said second surface and separated from said body by said groove, said flange extending from said second surface toward the plane of said first surface, said flange having a wiping/scraping edge adjacent said plane of said first surface and engaging said filter element inflow face while moving therealong for cleaning said inflow face, a resilient compressible mass pressed in said groove for resiliently urging said wiping/scraping edge of said flange against said filter element inflow face for cleaning same.

7. The apparatus of claim 6 in which said flange is tapered from said wiping/scraping edge along its length to a reduced width at its fixture at said second surface, said flange thereby having a sloped outer face which diverges away from said filter element inflow face from said wiping/scraping edge to said second surface.

8. The apparatus of claim 7 in which said flange has a free end which slopes away from said first surface and from said filter element inflow face as it extends from said wiping/scraping edge toward said groove, to thereby form said flange with an acute angle at said wiping/scraping edge.

9. A self-cleaning filter, comprising:
a housing having an inlet port for process liquid to be filtered and an outlet port for filtered liquid;
an annular filter element in said housing and separating said ports, said filter element having an interior inflow face communicating with said outlet port;
a solid cleaning disk of diameter slightly less than the inside diameter of said filter element and movable axially along said filter element inflow face in radially close spaced relation therefrom, and a cleaning ring coaxially fixed on the radially outer portion of said disk in substantially complete circumferential cleaning contact with said filter element inflow face for removing filtered-out solids therefrom, said cleaning disk having process liquid flow holes axially therethrough for passage of process liquid to be filtered and removed filtered-out solids away from said inlet port;
drive means extending through said disk generally along the length of said filter element and drivable for moving said cleaning disk axially back and forth along said filter element, said drive means including a shaft rotatably supported with respect to the housing, said shaft having means defining a threaded part which threadedly engages said cleaning disk for said moving of said cleaning disk axially along said filter element, said shaft having means defining a part adjacent said threaded part for axially slideably receiving said cleaning disk from threaded part and therewith allowing rotation of the shaft to continue even after the cleaning disk threads to and off the end of said threaded part of said shaft without damage to, or need for further axial movement of, said cleaning disk.

10. The apparatus of claim 9 in which said drive means further includes means for urging the threaded off cleaning disk against the threaded part of said shaft for re-engaging the threaded part and threadedly returning therealong upon reversal of the rotation of said shaft.

11. The apparatus of claim 10 in which said shaft has two said slideably receiving parts axially flanking said threaded part of said shaft, said slideably receiving parts being of diameter less than or equal to the root diameter of the threads of the threaded part for permitting the cleaning disk to thread off the threaded part and slide axially onto the adjacent one of said slideably receiving parts upon reaching the adjacent end of its travel, said means for urging comprising resilient compressing means associated with said slideably receiving parts for urging the threaded off cleaning member against the threaded part of said shaft for re-engaging the threaded part and threadedly returning therealong upon reversal of the rotation of said shaft.

12. A self-cleaning filter, comprising:
a housing having an inlet port for process liquid to be filtered and an outlet port for filtered liquid;
a filter element in said housing, said filter element having an inflow face communicating with said inlet port and an outflow face communicating with said outlet port, said filter element including a porous filter sleeve with said outflow face being formed by axially close spaced substantially annular rib means and said inflow face being formed by circumferentially close spaced axially extending ribs fixedly surrounded by said annular rib means;
a cleaning unit comprising an annular cleaning member movable axially along said filter element and having a substantially circumferentially continuous annular cleaning edge movable axially therewith in axially sliding cleaning engagement along said axially extending ribs of said inflow face of said filter element to remove collected solids therefrom;
drive means extending generally along the length of said filter element and drivable for moving said annular cleaning member axially back and forth along said filter element, said axially movable annular cleaning edge being flexible and being elastically urged against said axially extending ribs as it is moved axially therealong, said annular cleaning edge being spaced radially away from and out of contact with said axially spaced rib means by said axially extending ribs.

13. A self-cleaning filter, comprising:
a housing having an inlet port for process liquid to be filtered and an outlet port for filtered liquid;
a filter element in said housing, said filter element having an inflow face communicating with said inlet port and an outflow face communicating with said outlet port, said filter element including a porous filter sleeve with said outflow face being formed by axially close spaced substantially annular rib means and said inflow face being formed by circumferentially close spaced axially extending ribs fixedly surrounded by said annular rib means;
a cleaning unit comprising an annular cleaning member movable axially along said filter element and having an annular cleaning edge movable axially therewith in sliding cleaning engagement with said axially extending ribs of said inflow face of said filter element to remove collected solids therefrom;
drive means extending generally along the length of said filter element and drivable for moving said annular cleaning member axially back and forth along said filter element, said axially movable annular cleaning edge being flexible and being elastically urged against said axially extending ribs as it is moved axially therealong, said annular cleaning edge being spaced radially away from and out of contact with said axially spaced rib means by said axially extending ribs, said annular cleaning edge defining the annular free edge of a generally axially extending annular flange, a part of said flange axially remote from said free edge being mounted on a portion of said cleaning member, resilient means compressed in an annular groove radially between said annular cleaning edge and an adjacent part of said cleaning member for resiliently urging said cleaning edge against said axially extending ribs of said filter element.

14. A self-cleaning filter, comprising:
a housing having an inlet port for process liquid to be filtered and an outlet port for filtered liquid;
a filter element in said housing, the filter element having an inflow face receiving liquid to be filtered and an outflow face for supplying filtered liquid to said outflow port;
a shaft rotatably supported with respect to said housing and arranged adjacent said filter element, said shaft having an elongate threaded part defining a screw extending along and adjacent said filter element;
a cleaning member threaded on said screw for movement back and forth along said filter element upon forward and reverse rotation of said shaft, said cleaning member having a cleaning edge movable therewith in cleaning engagement with said filter element inflow face, said shaft having means permitting continued rotation of said shaft after said cleaning member reaches an end of said screw, and permitting means comprising extension means extending from said end of said screw (1) for axially slidable threading of said cleaning member off said screw end and into an idle position on said extension means and (2) for therewith allowing continued rotation of said shaft after said cleaning member reaches said end of said screw without damage to, or need for continued axial movement of, said cleaning member;
means actuable for reversibly rotating said shaft.

15. The apparatus of claim 14 including means for urging the threaded off cleaning member against said end of said screw and responsive to reversal of shaft rotation for threading said cleaning member back onto said screw to cause the reverse rotating screw to thread the cleaning member to the opposite end thereof and thus clean the adjacent filter element.

16. The apparatus of claim 15 in which said extension means is an extension of said shaft axially beyond the screw and of diameter less than the thread root diameter of said screw and said urging means is a compression spring sleeved on said shaft extension and axially resilient compressed by movement of said cleaning means off said end of said screw.

17. The apparatus of claim 16 including a similar spring and extension at the other end of said shaft, to allow continuous cleaning movement of said cleaning member back and forth along said filter element.

18. The apparatus of claim 14 in which said filter element is cylindrical and said cleaning unit includes means mounting said screw coaxially within said filter element to move said cleaning member along an interior face of said filter element for cleaning same.

19. The apparatus of claim 18 in which said cleaning member has a hole axially therethrough, and an antirotate rod fixed with respect to said housing and extending axially within said filter element through said hole in said cleaning member for preventing rotation of said cleaning member with said screw.

20. The apparatus of claim 14 in which said cleaning member has holes axially therethrough for passage of liquid to be filtered from one end of said filter element to the other.

* * * * *

UNITED STATES PATENT AND TRADEMARK OFFICE
CERTIFICATE OF CORRECTION

PATENT NO. : 5 198 111
DATED : March 30, 1993
INVENTOR(S) : Scott DAVIS It is certified that error appears in the above-identified patent and that said Letters Patent is hereby corrected as shown below:

Column 14, line 2; change "body" to ---portion---.

line 7; change "body" to ---portion---.
Column 16, line 32; change ", and" to ---, said---.
        lines 54 and 55; change "resilient" to ---resiliently---.

Signed and Sealed this

Eleventh Day of January, 1994

*Attest:*

BRUCE LEHMAN

*Attesting Officer*      *Commissioner of Patents and Trademarks*

UNITED STATES PATENT AND TRADEMARK OFFICE
CERTIFICATE OF CORRECTION

PATENT NO. : 5,198,111
DATED : March 30, 1993
INVENTOR(S) : Scott Davis

It is certified that error appears in the above-identified patent and that said Letters Patent is hereby corrected as shown below:

Column 14, line 6; delete "to said body".

Signed and Sealed this

Twenty-sixth Day of July, 1994

Attest:

BRUCE LEHMAN

Attesting Officer

Commissioner of Patents and Trademarks